Figure 1:
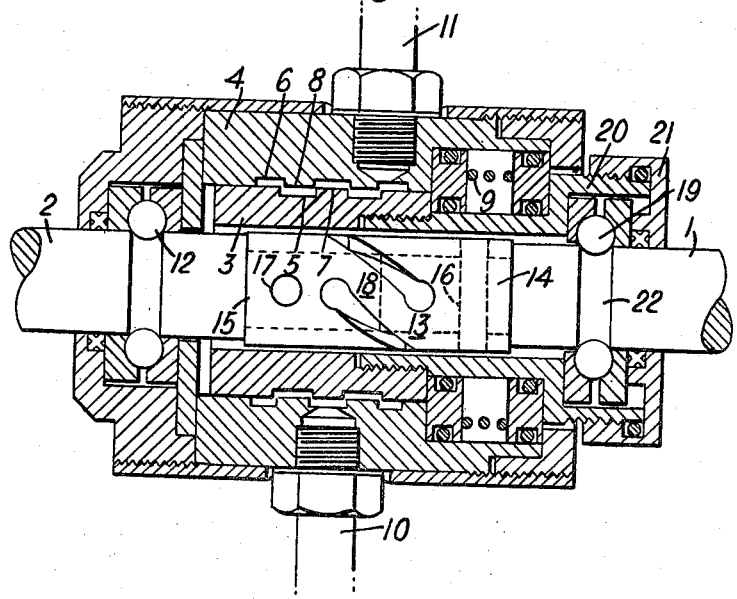

March 1, 1960 F. J. ADAMS 2,926,541
STEERING MECHANISM
Filed June 19, 1958

Inventor:
Frederick John Adams
By:
Baldwin & Wight
his Attorneys

United States Patent Office 2,926,541
Patented Mar. 1, 1960

2,926,541

STEERING MECHANISM

Frederick John Adams, Houghton Regis, near Dunstable, England, assignor to Hydrosteer Limited, Luton, England Application June 19, 1958, Serial No. 743,052

Claims priority, application Great Britain October 29, 1957

5 Claims. (Cl. 74—388)

This invention relates to steering mechanism for road vehicles and more particularly to such mechanism of the power-assisted type.

In such mechanism the operation of a power supply control valve is commonly effected by permitting the usual manually operated steering column to have a limited freedom of movement with respect to and due to the reaction of the input to the steering gear through which the manual effort is applied to the steering transmission this movement being effected against a restoring bias.

The steering column and the input component of the steering gear are commonly in axial alignment and it is the main purpose of this invention to provide a simple means for enabling the freedom of movement between the two parts to be obtained, such means being readily accommodated in the assembly of the mechanism.

According to the present invention the steering column part and the rotatable co-axial input component part of the steering gear are connected to another by metal strips the opposite ends of which are secured respectively to those two parts so that angular movement can be transmitted from one to the other through the strips the resilience of which however permits one part to move angularly relative to the other at which time the strips cause the two parts to have relative axial movement: this axial movement is thus available for use in operating the power control valve.

The strips would be disposed in spaced relation about the common axis of the column and the input component part and would usually be most conveniently of helical shape.

It is moreover preferred for ease of construction and assembly to form the strips in a metal sleeve between its two ends which later are arranged to be connected respectively to the column and the input component or an extension of it.

A positive limit could be set up to the relative movement which would be small: such a limit could be established by cooperating abutments which are spaced angularly to permit the small free movement at the limit of which the abutments would cooperate to enable the effort in the manually operated steering column to be transmitted direct through the abutments to the input to the steering gear in the event of failure of the power supply.

The resulting relative axial movement of the two parts can be utilised to effect valve operation by holding either the steering column or the input component against axial movement and connecting the other to the regulating part of the power control valve: alternatively both parts can move axially, one part being connected to the regulating part of the valve and the other to the housing in which it moves.

Figure 2:
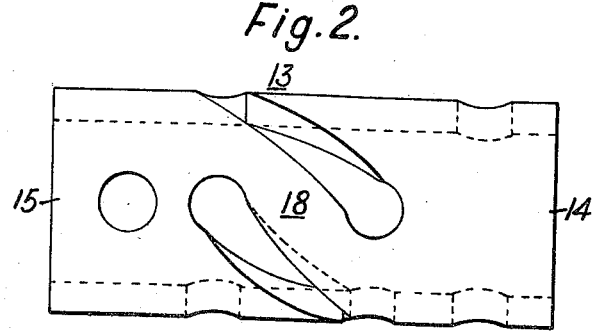

The invention is illustrated in the accompanying drawings in which Figure 1 is a longitudinal sectional of a steering mechanism at the part where the steering column is coupled to the steering gear and Figure 2 is an elevation of the connecting sleeve in accordance with this invention.

Referring firstly to Figure 1 this shows at 1 the manually operated steering column part which has at its outer end the usual steering wheel (not shown) and which is connected at its other or inner end to the spindle extension 2 of the input component part of a steering gear: the column 1 and the extension 2 are co-axial so that the turning of the column 1 results in the turning of the extension 2 which through the gear transmits a steering action on the parts to be steered. The term "gear" is used in the commonly accepted sense as meaning a mechanism such as a cam and follower or a screw and nut of which the follower or the nut is connected to the transmission extending to the parts to be steered.

The assembly comprises also a power control valve which consists of a regulating part 3 and a body 4, the part 3 is being in the form of a hollow cylindrical bobbin disposed about the column 1 and extension 2 and slidable in the hollow bore of the body 4 which is stationary. The bobbin 3 and the valve body 4 are formed at their opposed cylindrical faces with grooves 5, 6 which leave lands 7, 8 and the bobbin is based to an intermediate position by a centralising spring 9: the bobbin 3 and the body 4 control the supply and return of pressure liquid between a source of supply of pressure liquid, a double acting power unit and a reservoir, two of the flow connection being shown at 10, 11. The power unit can be of any known kind and it is coupled in some way or other to the steering mechanism to inject power into it. Such power assistance mechanism is already well-known and further description and illustration is believed to be unnecessary. It is necessary only to add that the reaction to turning which is set up by the input component 2 of the steering gear under the manual effort applied to it by the column 1 is used to operate the regulating part 3 of the valve.

The invention is concerned with the means by which the regulating part 3 of the valve is operated and this is achieved by connecting the steering column 1 to the input component 2 by a sleeve 13: the ends 14, 15 of the sleeve are respectively fitted over the adjacent ends of the column 1 and the extension 2 and are secured to those parts by pins 16, 17. Between those ends the sleeve is cut away to leave connecting strips 18 which are preferably and as shown of helical form.

These strips 18 through which the manual effort is applied from the column 1 to the extension 2 can yield resiliently so that the parts 1, 2 are permitted to have a relative angular movement against the reaction set up by the input to the steering gear. The strips 18 will also cause this relative angular movement to move the column 1 and the extension 2 to move relatively in the axial direction i.e. towards or away from one another and it is this axial movement which is employed to operate the regulating part 3 of the valve to obtain the injection of power to assist the applied manual effort applied to the column 1.

As it is a matter of action and reaction between the column 1 and the input component 2 which produces the relative axial valve operating movement, i.e. relative movement between the parts 3 and 4 of the valve it is necessary only to connect those parts respectively to the column 1 and the component 2 so that they are held against relative axial movement with respect to them. Thus either of the parts 1 or 2 can be held against axial movement, and the other part be free to move axially: in the particular case shown the part 2 is held against axial movement in the housing of the steering gear and the valve body 4 is connected to the part 2 by bearing 12 which allows the part 2 to turn in the housing but prevents it from moving axially.

In this case therefore the action of the strips 18 will be to move the column 1 in an axial direction and it is therefore merely necessary to connect the valve 3 to the column 1. This is effected as shown by providing the bobbin 3 with a sleeve extension 20 which houses a thrust ball bearing 19 the balls of which enter a race 22 in the column 1. As is shown the extension 20 can be closed by a cap 21. The ball bearing assembly 19 and the extension 20 serve as a means for transmitting movement of the column part 1 to the power control valve 3.

It will now be clear that the mechanism of this invention can be employed as a fitting for incorporation in the steering colunm of a vehicle equipped with power assisted steering mechanism of any known type whether the power unit be coaxial with the steering column or external to it. Thus it can be applied with advantage to provide a compact assembly with the screw and nut steering gear described in my pending application, Serial No. 752,250, filed July 31, 1958.

The valve arrangement shown in the drawings is shown only by way of example for the invention can obviously be employed to operate any other kind of control valve relying on an axial control movement. Thus, the control valve described and claimed in the specification of my pending application Serial No. 743,053, filed June 19, 1958, could be arranged for operation by the sleeve 13 of this invention.

It will be understood that the present invention includes not only the assembly described but also a complete vehicular power-assisted steering mechanism incorporating that assembly.

I claim:

1. A power operated steering mechanism assembly comprising a rotatable manually operable steering column part; a rotatable input component part of a steering gear coaxial therewith; helical resilient metal strips connecting said parts to one another to transmit angular movement from one part to the other through the strips, the resilience of the strips permitting one part to move angularly relative to the other against the action of the steering gear and causing the two parts to move relatively in the axial sense in response to relative angular movement of said parts; and means for transmitting the axial movement of one of said parts to a power control valve.

2. An assembly as claimed in claim 1 and wherein the strips are disposed in spaced relationship about the common axis.

3. An assembly as claimed in claim 1 and wherein the strips are formed in a metal sleeve between its ends which ends are respectively secured to the column part and the input component part.

4. An assembly as claimed in claim 1 and comprising also a two-part hollow power control valve disposed about the column part, the input component part and the connecting strips, the two parts of the valve being axially movable relatively to one another and one part being held against axial movement with respect to the column part and the other part being held against axial movement with respect to the input component part.

5. An assembly as claimed in claim 4 and wherein the input component part is held against axial movement, and wherein one of the valve parts is in the form of a bobbin slidable axially in the other of the valve parts which is in the form of a housing held against axial movement, the bobbin being held against axial movement relative to the steering column part.

References Cited in the file of this patent

UNITED STATES PATENTS

| | | |
|---|---|---|
| 1,315,782 | Leggett | Sept. 9, 1919 |
| 2,844,351 | Smith | June 22, 1958 |
| 2,860,495 | Stark | Nov. 18, 1958 |
| 2,865,218 | Bishop | Dec. 23, 1958 |